US011992894B2

(12) United States Patent
Fiaz et al.

(10) Patent No.: US 11,992,894 B2
(45) Date of Patent: May 28, 2024

(54) METHOD OF SEPARATING A LIQUID LENS FROM AN ARRAY OF LIQUID LENSES

(71) Applicant: CORNING INCORPORATED, Corning, NY (US)

(72) Inventors: Hasan Fiaz, Goleta, CA (US); Jann Paul Kaminski, Santa Barbara, CA (US); Raymond Miller Karam, Santa Barbara, CA (US); Brian Nilsen, Goleta, CA (US); Marie Bernadette O'Regan, Santa Barbara, CA (US); Garrett Andrew Piech, Corning, NY (US); Sergio Tsuda, Horseheads, NY (US); ChuanChe Wang, Horseheads, NY (US); Ming Ying, Santa Barbara, CA (US)

(73) Assignee: CORNING INCORPORATED, Corning, NY (US)

(*) Notice: Subject to any disclaimer, the term of this patent is extended or adjusted under 35 U.S.C. 154(b) by 362 days.

(21) Appl. No.: 16/971,501

(22) PCT Filed: Feb. 22, 2019

(86) PCT No.: PCT/US2019/019238
§ 371 (c)(1),
(2) Date: Aug. 20, 2020

(87) PCT Pub. No.: WO2019/165269
PCT Pub. Date: Aug. 29, 2019

(65) Prior Publication Data
US 2021/0086294 A1 Mar. 25, 2021

Related U.S. Application Data

(60) Provisional application No. 62/634,630, filed on Feb. 23, 2018.

(51) Int. Cl.
*B23K 26/00* (2014.01)
*B23K 26/32* (2014.01)
(Continued)

(52) U.S. Cl.
CPC .......... *B23K 26/0006* (2013.01); *B23K 26/32* (2013.01); *C03B 33/0222* (2013.01); *C03C 23/0025* (2013.01); *C03C 27/08* (2013.01)

(58) Field of Classification Search
CPC ............ B23K 2103/52; B23K 2103/54; B23K 26/0006; B23K 26/32; B23K 26/324;
(Continued)

(56) References Cited

U.S. PATENT DOCUMENTS 5,489,321 A    2/1996  Tracy et al.
8,922,901 B2  12/2014  Karam et al.
(Continued)

FOREIGN PATENT DOCUMENTS

CN    106029293 A    10/2016
EP      1986023 A1   10/2008
(Continued)

OTHER PUBLICATIONS

International Search Report and Written Opinion of the International Searching Authority; PCT/US2019/019238; dated Jul. 16, 2019; '13 Pages; European Patent Office.
(Continued)

*Primary Examiner* — Dana Ross
*Assistant Examiner* — Adam M Eckardt

(57) ABSTRACT

A method of separating a portion of an object comprising: presenting an object having a thickness; using a laser emission at a wavelength to perforate at least a portion of the thickness of the object sequentially over a length to form a series of perforations between a first portion of the object on one side of the series of perforations and a second portion of
(Continued)

the object on the other side of the series of perforations; and applying a stress to the object at the series of perforations to separate the first portion of the object from the second portion of the object, wherein the thickness of the object, at the series of perforations, is transparent to the wavelength of the laser emission.

15 Claims, 11 Drawing Sheets

(51) Int. Cl.
    *C03B 33/02*     (2006.01)
    *C03C 23/00*     (2006.01)
    *C03C 27/08*     (2006.01)

(58) Field of Classification Search
    CPC ........ B23K 26/38; B23K 26/53; B23K 26/00; B23K 103/00; B28D 5/0011; C03C 23/0025; C03C 27/08; C03C 23/00; C03B 33/0222; C03B 33/02; C03B 33/09; G02B 13/0085; G02B 26/005; G02B 3/14; G02B 26/00; G02B 3/00; G02B 3/12

See application file for complete search history.

(56) References Cited

U.S. PATENT DOCUMENTS

| | | | |
|---|---|---|---|
| 9,120,287 B2 * | 9/2015 | Ruben | B32B 17/06 |
| 9,492,990 B2 | 11/2016 | Karam et al. | |
| 9,515,286 B2 | 12/2016 | Dabich et al. | |
| 9,850,159 B2 | 12/2017 | Bhuyan et al. | |
| 9,850,160 B2 | 12/2017 | Marjanovic et al. | |
| 2009/0250446 A1 | 10/2009 | Sakamoto | |
| 2014/0199519 A1 | 7/2014 | Schillinger et al. | |
| 2014/0347741 A1 | 11/2014 | Karam et al. | |
| 2015/0027168 A1 * | 1/2015 | Dabich, II | C03C 4/0071 65/41 |
| 2015/0070779 A1 * | 3/2015 | Karam | G02B 3/0012 359/665 |
| 2015/0165560 A1 | 6/2015 | Hackert et al. | |
| 2015/0165563 A1 | 6/2015 | Manley et al. | |
| 2015/0166393 A1 | 6/2015 | Marjanovic et al. | |
| 2018/0118603 A1 * | 5/2018 | Nieber | B23K 26/0006 |

FOREIGN PATENT DOCUMENTS

| | | |
|---|---|---|
| EP | 2103982 A1 | 9/2009 |
| JP | 2004-229167 A | 8/2004 |
| TW | I415706 B | 11/2013 |
| WO | 96/02473 A1 | 2/1996 |

OTHER PUBLICATIONS

Taiwanese Patent Application No. 108106018, Office Action, dated May 15, 2023, 1 page; Taiwanese Patent Office.

* cited by examiner

METHOD OF SEPARATING A LIQUID LENS FROM AN ARRAY OF LIQUID LENSES

CROSS-REFERENCE TO RELATED APPLICATIONS

This application claims the benefit of priority under 35 U.S.C. § 371 of International Application No. PCT/US2019/019238, filed on Feb. 22, 2019, which claims the benefit of priority under 35 U.S.C. § 119 of U.S. Provisional Application No. 62/634,630, filed Feb. 23, 2018, the content of each of which is incorporated herein by reference in its entirety.

BACKGROUND

The present disclosure generally relates to using a laser emission to form a series of perforations through an object, such as an array of lens devices including liquid lenses, before applying a stress to separate the object at the series of perforations. Separating a liquid lens from an array of liquid lenses through mechanical dicing can cause defects in the liquid lens. Perforating the array of liquid lenses between the liquid lens and liquid lenses adjacent the liquid lens before separating the liquid lens from the array of liquid lenses can prevent such defects caused by mechanical dicing.

SUMMARY

According to a first aspect, a method of separating a portion of an object comprises: presenting an object having a thickness; using a laser emission at a wavelength to perforate at least a portion of the thickness of the object sequentially over a length to form a series of perforations between a first portion of the object on one side of the series of perforations and a second portion of the object on the other side of the series of perforations; and applying a stress to the object at the series of perforations to separate the first portion of the object from the second portion of the object, wherein the thickness of the object, at the series of perforations, is transparent to the wavelength of the laser emission.

According to a second aspect, the method of the first aspect is provided, wherein the laser emission perforates the entire thickness of the object.

According to a third aspect, the method of any one of the first or second aspects is provided, wherein the series of perforations comprises perforations that have a diameter of between 3 μm and 7 μm.

According to a fourth aspect, the method of any one of the first through third aspects is provided, wherein the series of perforations comprises a first perforation and a second perforation separated by a distance of between 7 μm and 10 μm.

According to a fifth aspect, the method of any one of the first through fourth aspects is provided, wherein the object comprises a glass material.

According to a sixth aspect, the method of any one of the first through fifth aspects is provided, the object further comprising: a first layer that is transparent to the wavelength of the laser emission, a second layer that is not transparent to the wavelength of the laser emission, and a third layer that is transparent to the wavelength of the laser emission; the method further comprising: bonding the first layer to the third layer throughout a bonded volume that is transparent to the wavelength of the laser emission, wherein the bonding step is conducted before the using the laser emission step, and wherein the series of perforations extend through the bonded volume.

According to a seventh aspect, the method of the sixth aspect is provided, wherein bonding the first layer to the third layer throughout the bonded volume comprises diffusing the second layer into the first layer and into the third layer forming the bonded volume and the resulting bonded volume is transparent to the wavelength of the laser emission.

According to an eighth aspect, the method of the sixth aspect is provided, wherein the bonding the first layer to the third layer throughout the bonded volume comprises melting the first layer and the third layer and fusing the first layer and the third layer together.

According to a ninth aspect, the method of any one of the sixth through eighth aspects is provided, wherein the second layer comprises a metal.

According to a tenth aspect, the method of any one of the sixth through ninth aspects is provided, wherein the first layer comprises a glass material.

According to an eleventh aspect, the method of any one of the first through tenth aspects is provided, wherein the object is an array of lens devices.

According to a twelfth aspect, the method of the eleventh aspect is provided, wherein the object is an array of lens devices, and wherein the stress comprises bending the object at the series of perforations.

According to a thirteenth aspect, a method of separating liquid lenses comprises: using a laser emission at a wavelength to perforate at least a portion of a thickness of an array of liquid lenses sequentially over a length of the array of liquid lenses to form a series of perforations between a first liquid lens on one side of the series of perforations and a second liquid lens on the other side of the series of perforations; and applying a stress to the array of liquid lenses at the series of perforations to separate the first liquid lens from the second liquid lens.

According to a fourteenth aspect, the method of the thirteenth aspect is provided, wherein the first liquid lens comprises: a first outer layer, a second outer layer, an intermediate layer between the first outer layer and the second outer layer, the intermediate layer having a through hole, the first outer layer having an external surface and the second outer layer having an external surface; a cavity disposed between the first outer layer and the second outer layer, and within the through hole; and a first liquid and a second liquid disposed within the cavity, the first liquid and the second liquid separated at an interface, wherein the first outer layer, the second outer layer, and the intermediate layer are transparent to the wavelength of the laser emission, wherein the thickness of the array of liquid lenses is between the external surface of the first outer layer and the external surface of the second outer layer of the first liquid lens, and wherein using the laser emission to perforate at least a portion of the thickness of the array of liquid lenses comprises perforating through the first outer layer, the second outer layer, and the intermediate layer of the first liquid lens.

According to a fifteenth aspect, the method of the fourteenth aspect is provided, wherein the first liquid lens further comprises: a first conductive layer that is not transparent to the wavelength of the laser emission between the first outer layer and the intermediate layer; and a second conductive layer that is not transparent to the wavelength of the laser emission between the intermediate layer and the second outer layer; the method further comprising: bonding the first outer layer to the intermediate layer throughout a first bonded volume and the first bonded volume is transparent to the wavelength of the laser emission; bonding the intermediate layer to the second outer layer throughout a second bonded volume and the second bonded volume is transparent to the wavelength of the laser emission; wherein the first bonded volume is disposed spatially above the second bonded volume.

According to a sixteenth aspect, the method of the fifteenth aspect is provided, wherein bonding the first outer layer to the intermediate layer throughout the first bonded volume comprises diffusing the first conductive layer into the first outer layer and into the intermediate layer forming the first bonded volume and the resulting first bonded volume is transparent to the wavelength of the laser emission, and wherein bonding the intermediate layer to the second outer layer throughout the second bonded volume comprises diffusing the second conductive layer into the second outer layer and into the intermediate layer forming the second bonded volume and the resulting second bonded volume is transparent to the wavelength of the laser emission.

According to a seventeenth aspect, the method of the fifteenth aspect is provided, wherein bonding the first outer layer to the intermediate layer throughout the first bonded volume comprises melting the first outer layer and the intermediate layer, and fusing the first outer layer and the intermediate layer together, and wherein bonding the intermediate layer to the second outer layer throughout the second bonded volume comprises melting the intermediate layer and the second outer layer, and fusing the intermediate layer and the second outer layer together.

According to an eighteenth aspect, the method of any one of the fifteenth through seventeenth aspects is provided, wherein using the laser emission to perforate at least a portion of the thickness of the array of liquid lenses comprises perforating through the first bonded volume and the second bonded volume of the first liquid lens.

According to a nineteenth aspect, the method of any one of the fifteenth through seventeenth aspects is provided, wherein using the laser emission to perforate at least a portion of the thickness of the array of liquid lenses comprises perforating adjacent to the first bonded volume and the second bonded volume of the first liquid lens where a gap between the first outer layer and the intermediate layer, and a gap between the intermediate layer and the second outer layer, are minimized immediately adjacent the first bonded volume and the second bonded volume respectively.

According to a twentieth aspect, the method of any one of the fifteenth through nineteenth aspects is provided, the first liquid lens further comprising: a first aperture through the first outer layer exposing the first conductive layer, the first aperture configured to provide a first electrical contact point between the first liquid lens and another electrical device; and a second aperture through the second outer layer exposing the second conductive layer, the second aperture configured to provide a second electrical contact point between the first liquid lens and another electrical device, wherein the first aperture is disposed between a first window of the first liquid lens and the series of perforations, and the second aperture is disposed between a second window of the first liquid lens and the series of perforations.

According to a twenty-first aspect, the method of any one of the fifteenth through twentieth aspects is provided, wherein bonding of the first outer layer to the intermediate layer via the first bonded volume and bonding of the intermediate layer to the second outer layer via the second bonded volume encloses the first liquid lens.

According to a twenty-second aspect, the method of any one of the fifteenth through twenty-first aspects is provided, wherein the first bonded volume has a width and the second bonded volume has a width, and wherein the width of the first bonded volume and the second bonded volume are different.

According to a twenty-third aspect, the method of the twenty-second aspect is provided, wherein the width of the whichever of the first bonded volume or the second bonded volume is closer to the laser emission used to perforate is at least ten percent wider than the other width.

According to a twenty-fourth aspect, the method of the twenty-second aspect is provided, wherein the width of the whichever of the first bonded volume or the second bonded volume is closer to the laser emission used to perforate is at least fifty percent wider than the other width.

According to a twenty-fifth aspect, the method of the twenty-second aspect is provided, wherein the width of the whichever of the first bonded volume or the second bonded volume is closer to the laser emission used to perforate is at least twice as wide as the other width.

According to a twenty-sixth aspect, the method of any one of the fifteenth through twenty-fifth aspects is provided, wherein the first conductive layer and the second conductive layer comprise metal.

According to a twenty-seventh aspect, the method of the twenty-sixth aspect is provided, wherein the metal comprises gold, chromium, titanium, nickel, or copper.

According to a twenty-eighth aspect, the method of the twenty-sixth aspect is provided, wherein the metal comprises one or more of the metals, and oxides thereof, of Groups 4, 5, 6, 11, 13, and 14 of the Periodic Table, including mixed metal oxides.

According to a twenty-ninth aspect, any one of the fourteenth through twenty-eighth aspects is provided, wherein the first outer layer and the second outer layer of the liquid lens comprise a glass material.

According to a thirtieth aspect, any one of the fourteenth through twenty-eighth aspects is provided, wherein the first outer layer, the second outer layer, and the intermediate layer of the liquid lens comprise a glass material.

According to a thirty-first aspect, any one of the fourteenth through thirtieth aspects is provided, wherein the through hole has a narrow opening and a wide opening, each of which having a diameter, wherein the diameter of the wide opening is greater than the diameter of the narrow opening, wherein the diameter of the wide opening is approximately adjacent to the first bonded volume, and wherein the wide opening is approximately adjacent to the first bonded volume and the diameter of the wide opening is approximately equal to an inside width between opposite sides of the first liquid lens.

According to a thirty-second aspect, the method of any one of the thirteenth through thirty-first aspects is provided, wherein the thickness of the array of liquid lenses at the series of perforations is transparent to the wavelength of the laser emission.

According to a thirty-third aspect, the method of any one the thirteenth through thirty-second aspects is provided, wherein the series of perforations comprises perforations that have a diameter of between 3 µm and 7 µm.

According to a thirty-fourth aspect, the method of any one of the thirteenth through thirty-third aspects is provided, wherein applying a stress to the array of liquid lenses at the series of perforations to separate the first liquid lens from the second liquid lens comprises bending the array of liquid lenses at the series of perforations until the first liquid lens separates from the second liquid lens.

According to a thirty-fifth aspect, a liquid lens comprises: a first outer layer; a second outer layer; an intermediate layer between the first outer layer and the second outer layer, the intermediate layer having a through hole; a cavity disposed between the first outer layer and the second outer layer, and within the through hole; a first liquid and a second liquid disposed within the cavity, the first liquid and the second liquid separated at an interface; a first conductive layer between the first outer layer and the intermediate layer; and a second conductive layer between the intermediate layer and the second outer layer, wherein the first outer layer is bonded with the intermediate layer at a first bonded volume, and the second outer layer is bonded with the intermediate layer at a second bonded volume, and wherein the first bonded volume is disposed spatially above the second bonded volume, and the combination of the first bonded volume and the second bonded volume form a contiguous outer edge of the liquid lens.

According to a thirty-sixth aspect, the liquid lens of the thirty-fifth aspect is provided, wherein the first bonded volume comprises a portion of the first conductive layer diffused into both the first outer layer and the intermediate layer, and the second bonded volume comprises a portion of the second conductive layer diffused into both the intermediate layer and the second outer layer.

According to a thirty-seventh aspect, the liquid lens of any of the thirty-fifth through thirty-sixth aspects is provided, further comprising: a first aperture through the first outer layer exposing the first conductive layer, the first aperture configured to provide a first electrical contact point for an electrical connection with the liquid lens; and a second aperture through the second outer layer exposing the second conductive layer, the second aperture configured to provide a second electrical contact point for an electrical connection with the liquid lens, wherein the first aperture is disposed between a first window of the liquid lens, and the second aperture is disposed between a second window of the liquid lens and the contiguous outer edge.

According to a thirty-eighth aspect, the liquid lens of any of the thirty-fifth through thirty-seventh aspects is provided, wherein the first bonded volume has a first width and the second bonded volume has a second width, and the first width and the second width are different such that one of the first width or the second width is the wider width and the other of the first width or the second with is the narrower width.

According to a thirty-ninth aspect, the liquid lens of any of the thirty-fifth through thirty-eighth aspects is provided, wherein the first conductive layer and the second conductive layer comprise metal.

According to a fortieth aspect, the liquid lens of the thirty-ninth aspect is provided, wherein the metal comprises gold, chromium, titanium, nickel, or copper.

According to a forty-first aspect, the liquid lens of the thirty-ninth aspect is provided, wherein the metal comprises one or more of the metals, and oxides thereof, of Groups 4, 5, 6, 11, 13, and 14 of the Periodic Table, including mixed metal oxides.

According to a forty-third aspect, the liquid lens of any of the thirty-fifth through forty-first aspects is provided, wherein the first outer layer, the second outer layer, and the intermediate layer of the liquid lens comprise a glass material.

According to a forty-fourth aspect, the liquid lens of any of the thirty-fifth through forty-third aspects is provided, wherein the liquid lens is transparent through the first bonded volume and the second bonded volume.

According to a forty-fifth aspect, the liquid lens of any of the thirty-fifth through forty-fourth aspects is provided, wherein the through hole has a narrow opening and a wide opening, each of which having a diameter, wherein the diameter of the wide opening is greater than the diameter of the narrow opening, and wherein the wide opening is approximately adjacent to the first bonded volume and the diameter of the wide opening is approximately equal to an inside width between opposite sides of the contiguous outer edge of the liquid lens.

According to a forty-sixth aspect, an array of liquid lenses comprises: a first liquid lens and a second liquid lens adjacent the first liquid lens; each of the first liquid lens and the second liquid lens comprising: a first outer layer; a second outer layer; an intermediate layer between the first outer layer and the second outer layer, the intermediate layer having a through hole; a cavity disposed between the first outer layer and the second outer layer, and within the through hole; a first liquid and a second liquid disposed within the cavity, the first liquid and the second liquid separated by an interface; a first conductive layer between the first outer layer and the intermediate layer; and a second conductive layer between the intermediate layer and the second outer layer, wherein the first outer layer is bonded with the intermediate layer at a first bonded volume, and the second outer layer is bonded with the intermediate layer at a second bonded volume, and wherein the first bonded volume is disposed spatially above the second bonded volume, and the combination of the first bonded volume and the second bonded volume form a contiguous outer edge of the liquid lens, wherein a portion of the first bonded volume and the second bonded volume of the first liquid lens is shared in common as a portion of the first bonded volume and the second bonded volume of the second liquid lens.

According to a forty-seventh aspect, the array of liquid lenses of the forty-sixth aspect is provided, wherein the first bonded volume comprises a portion of the first conductive layer diffused into both the first outer layer and the intermediate layer, and the second bonded volume comprises a portion of the second conductive layer diffused into both the intermediate layer and the second outer layer.

According to a forty-eighth aspect, the array of liquid lenses of any of the forty-sixth through forty-seventh aspects is provided, the first liquid lens and the second liquid lens each further comprising: a first aperture through the first outer layer exposing the first conductive layer, the first aperture configured to provide a first electrical contact point for an electrical connection with the liquid lens; and a second aperture through the second outer layer exposing the second conductive layer, the second aperture configured to provide a second electrical contact point for an electrical connection with the liquid lens, wherein the first aperture is disposed between a first window of the liquid lens and the contiguous outer edge, and the second aperture is disposed between a second window of the liquid lens and the contiguous outer edge.

According to a forty-ninth aspect, the array of liquid lenses of any of the forty-sixth through forty-eighth aspects is provided, further comprising: a series of perforations through the portion of the first bonded volume and the second bonded volume of the first liquid lens and the second liquid lens shared in common, the series of perforations configured to assist in the separation of the first liquid lens from the second liquid lens.

According to a fiftieth aspect, the array of liquid lenses of any of the forty-sixth through forty-ninth aspects is provided, wherein the first bonded volume of both the first liquid lens and the second liquid lens has a first width and the second bonded volume has a second width, and the first width and the second width are different such that one of the first width or the second width is the wider width and the other of the first width or the second width is the narrower width.

According to a fifty-first aspect, the array of liquid lenses of any of the forty-sixth through fiftieth aspects is provided, wherein the first conductive layer and the second conductive layer comprise metal.

According to a fifty-second aspect, the array of liquid lenses of any of the fifty-first aspect is provided, wherein the metal comprises gold, chromium, titanium, nickel, or copper.

According to a fifty-third aspect, the array of liquid lenses of any of the fifty-first aspect is provided, wherein the metal comprises one or more of the metals, and oxides thereof, of Groups 4, 5, 6, 11, 13, and 14 of the Periodic Table, including mixed metal oxides.

According to a fifty-fourth aspect, the array of liquid lenses of any of the forty-sixth through fifty-third aspects is provided, wherein the first outer layer and the second outer layer comprise a glass material.

According to a fifty-fifth aspect, the array of liquid lenses of any of the forty-sixth through fifty-third aspects is provided, wherein the first outer layer, the second outer layer, and the intermediate layer comprise a glass material.

According to a fifty-sixth aspect, the array of liquid lenses of any of the forty-sixth through fifty-fifth aspects is provided, wherein the array of liquid lenses is transparent to a laser emission at a wavelength through the first bonded volume and the second bonded volume.

According to a fifty-seventh aspect, the array of liquid lenses of any of the forty-sixth through fifty-sixth aspects is provided, wherein the through hole has a narrow opening and a wide opening, each of which having a diameter, wherein the diameter of the wide opening is greater than the diameter of the narrow opening, and wherein the wide opening is approximately adjacent to the first bonded volume and the diameter of the wide opening is approximately equal to an inside width between opposite sides of the contiguous outer edge of the liquid lens.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
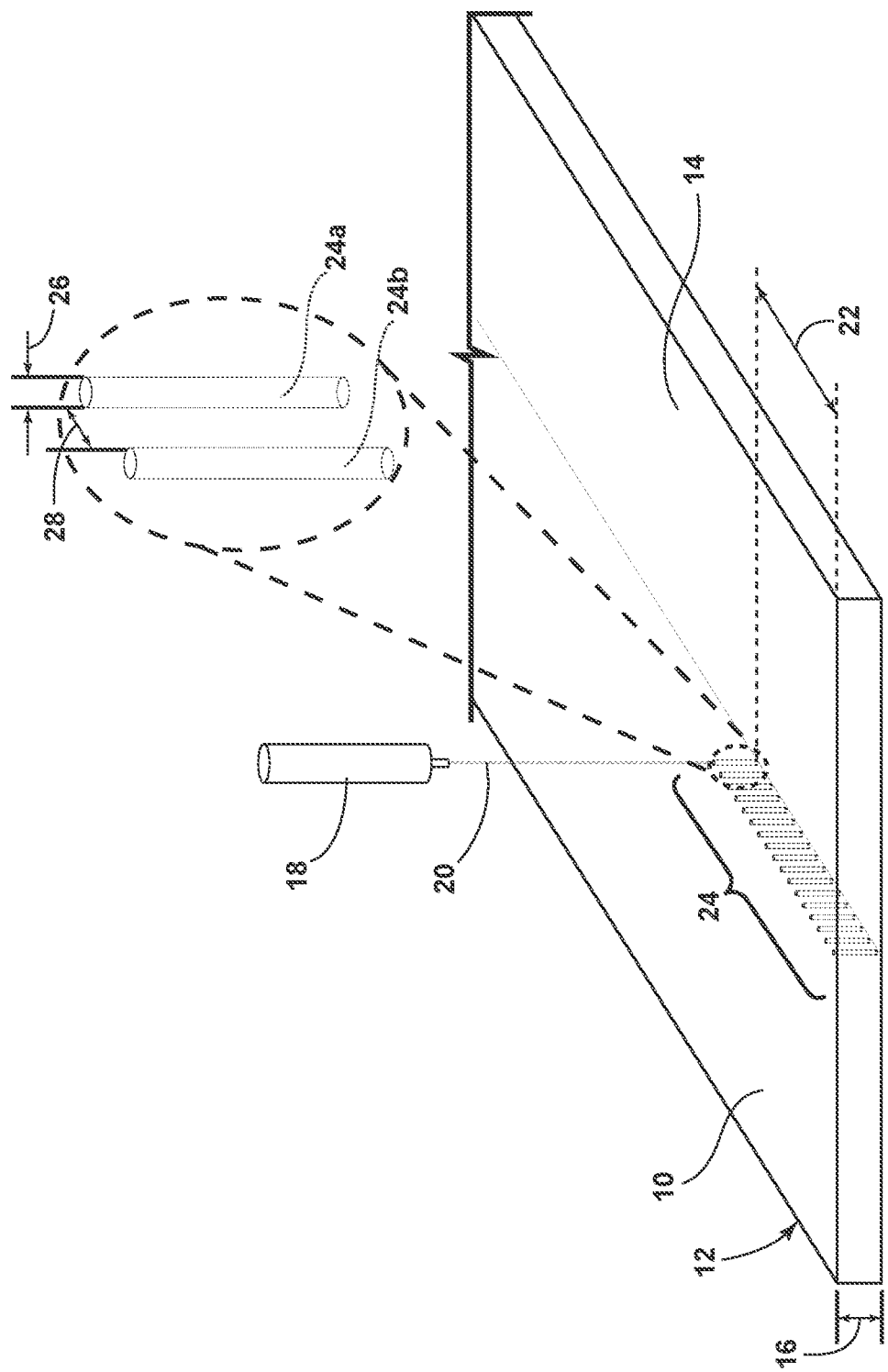
FIG. 1 is a perspective view of an object, illustrating a laser emission forming a series of perforations through a thickness in the object between a first portion of the object and a second portion.

Reference will now be made in detail to the present preferred embodiments, examples of which are illustrated in the accompanying drawings. Whenever possible, the same reference numerals will be used throughout the drawings to refer to the same or like parts.

Figure 2:
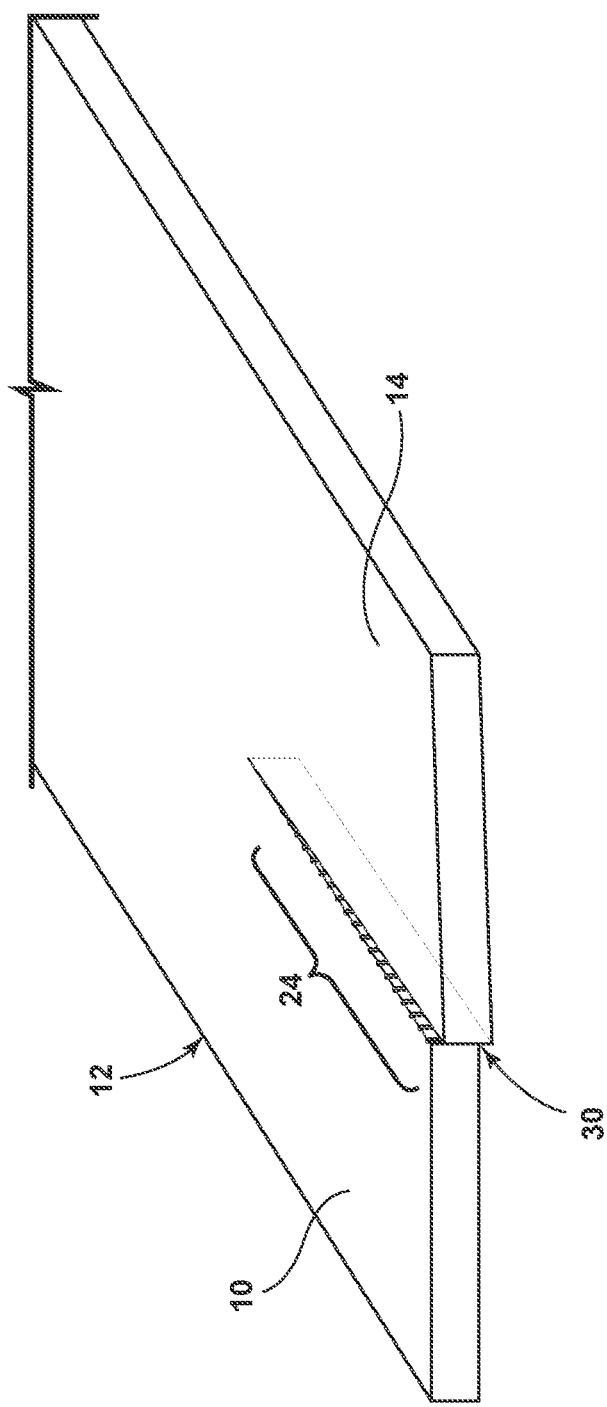
FIG. 2 is a perspective view of the object of FIG. 1, illustrating a stress applied at the series of perforations separating the first portion of the object from the second portion.

Referring now to FIGS. 1 and 2, exemplary embodiments of a novel method of separating a first portion 10 of an object 12 from a second portion 14 of the object 12 are herein described. The object 12 having a thickness 16 is presented. At least a portion of the thickness 16 of the object 12 is perforated using a laser 18 emission 20. The laser 18 emission 20, which is at a wavelength, perforates at least a portion of the thickness 16 of the object 12 sequentially over a length 22 of the object 12 to form a series of perforations 24. In some embodiments, the laser 18 emission 20 perforates the entire thickness 16 of the object 12. The series of perforations 24 are formed between the first portion 10 of the object 12 on one side of the series of perforations 24 and the second portion 14 on the other side of the series of perforations 24. The thickness 16 of the object 12 is transparent to the wavelength of the laser 18 emission 20 at the series of perforations 24, meaning that the object 12 does not absorb or block the emission 20 and the emission 20 proceeds through the thickness 16 of the object 12. For example, as used herein, the term "transparent" means that the material has an optical absorption of less than about 20 percent per mm of thickness 16 for the wavelength of the emission 20, such as less than about 10 percent per mm of thickness 16, or such as less than about 1 percent per mm of thickness 16. If the thickness 16 of the object 12 was not transparent to the wavelength, then the laser 18 emission 20 may not penetrate the desired thickness 16 of the object 12. The perforations of the series of perforations 24 can have a diameter 26 of between 3 μm and 7 μm, such as about 5 μm. The perforations of the series of perforations 24, such as a first perforation 24a and a second perforation 24b, can be separated by a distance 28 of between 7 μm and 10 μm. A stress 30 is then applied to the object 12 at the series of perforations 24 to separate the first portion 10 of the object 12 from the second portion 14 of the object 12. The stress 30 can be provided by stressing the object 12 at the series of perforations 24 between the first portion 10 and the second portion 14, such as any tensile stress, by in-plane pulling, application of heat from a thermal or infrared laser (e.g., $CO_2$ or CO laser), thermal shock, heating, cooling, among other things. The stress 30 leads to a stress concentration at each perforation of the series of perforations 24. The stress concentration can result in a crack emanating from the perforations of the series of perforations 24 and propagating through all the perforations of the series of perforations 24, with the end result being separation of the first portion 10 from the second portion 12. In some embodiments, the stress 30 is provided by bending the object 12 at the series of perforations 24. In some embodiments, stress 30 is provided by a tape base die expander. In some embodiments, the stress 30 is imparted while the object 12 is mounted on a tape (such as a polymer tape), including while the emission 20 is imparting the series of perforations 24.

Figure 3:
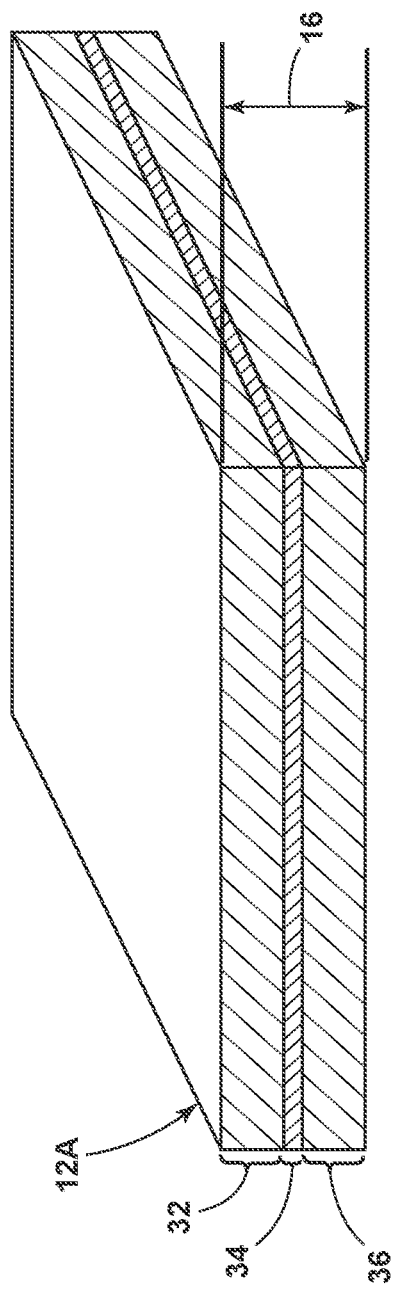
FIG. 3 is a perspective view of another embodiment of the object, illustrating a first layer, a third layer, and a second layer between the first layer and the third layer.
Figure 4:
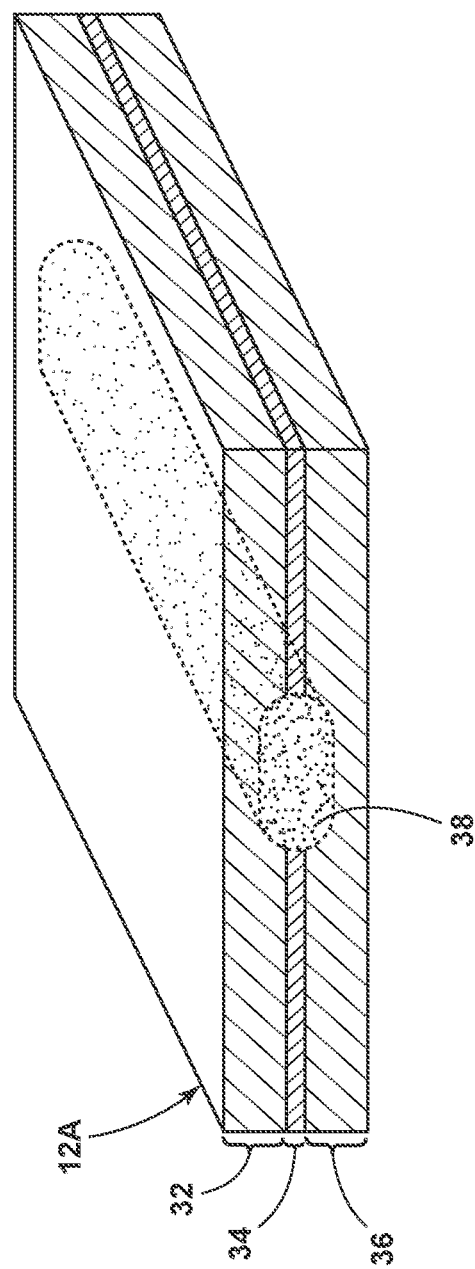
FIG. 4 is a perspective view of the object of FIG. 3, illustrating a portion of the second layer diffused into the first layer and into the third layer forming a bonded volume.
Figure 5:
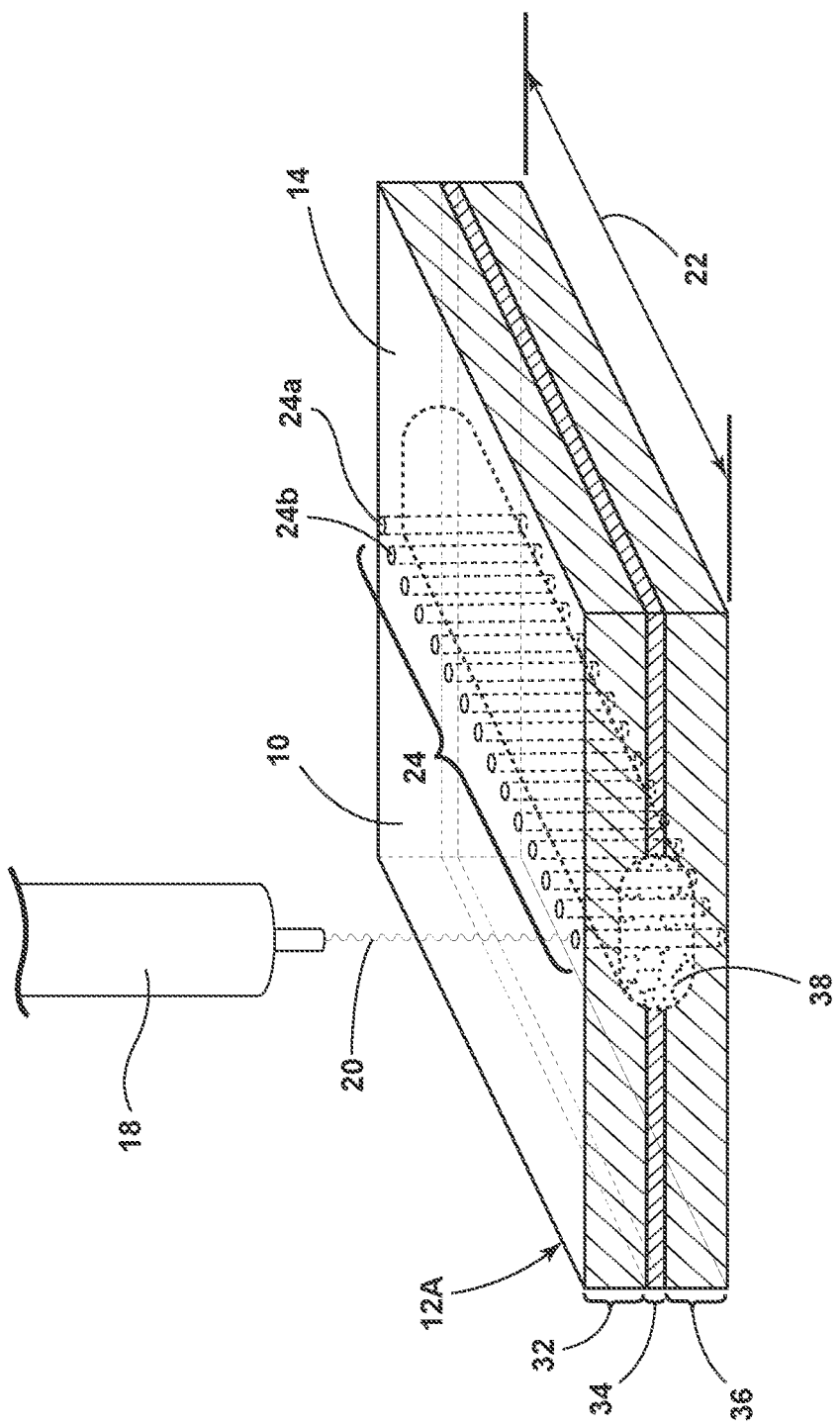
FIG. 5 is a perspective view of the object of FIG. 3, illustrating the laser emission forming a series of perforations that extend through the bonded volume between the first portion of the object and the second portion.
Figure 6:
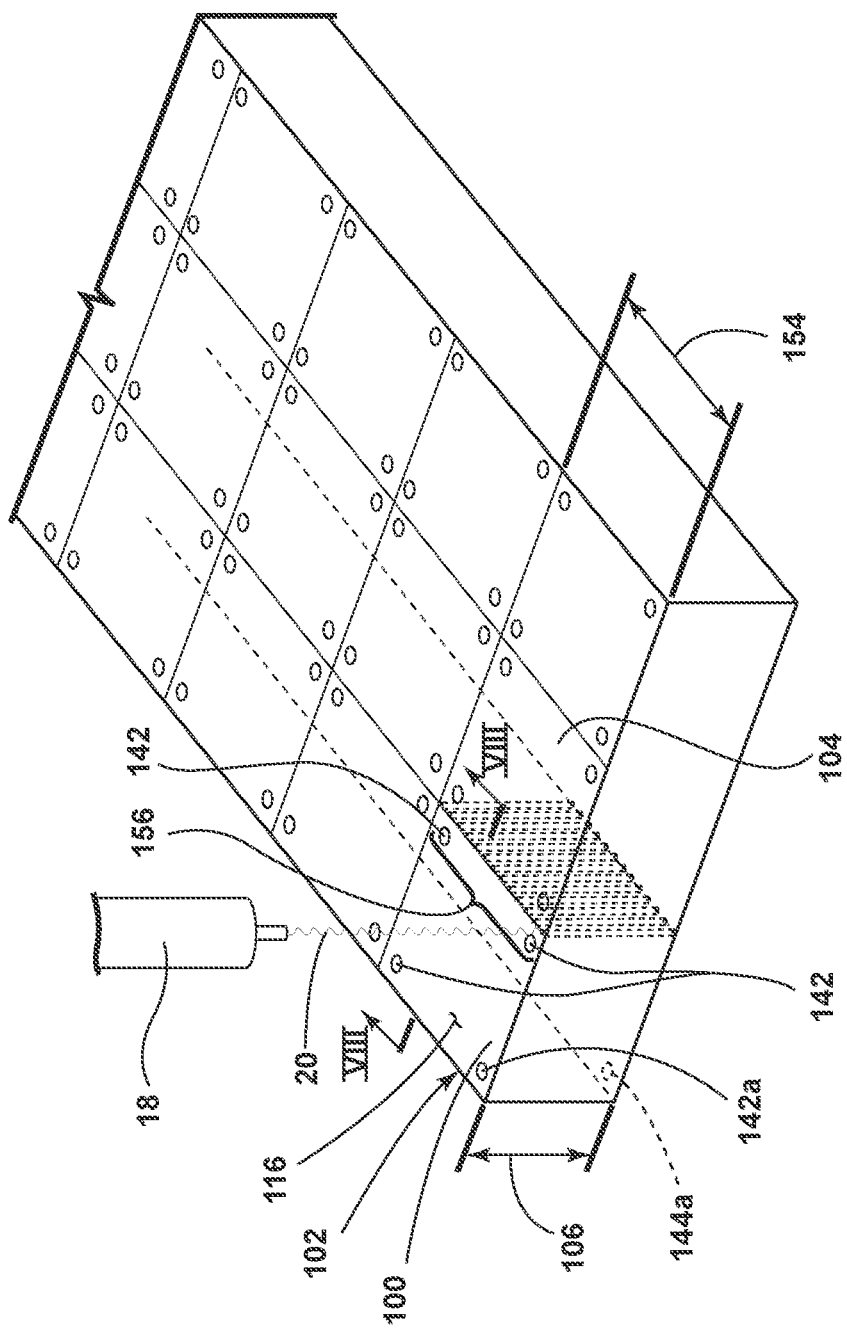
FIG. 6 is a perspective view of an array of liquid lenses, illustrating a laser emission forming a series of perforations through a thickness of the array of liquid lenses and throughout a length between a first liquid lens and a second liquid lens, in order to achieve improved separation of the first liquid lens from the second liquid lens and the array of liquid lenses without defects.
Figure 7:
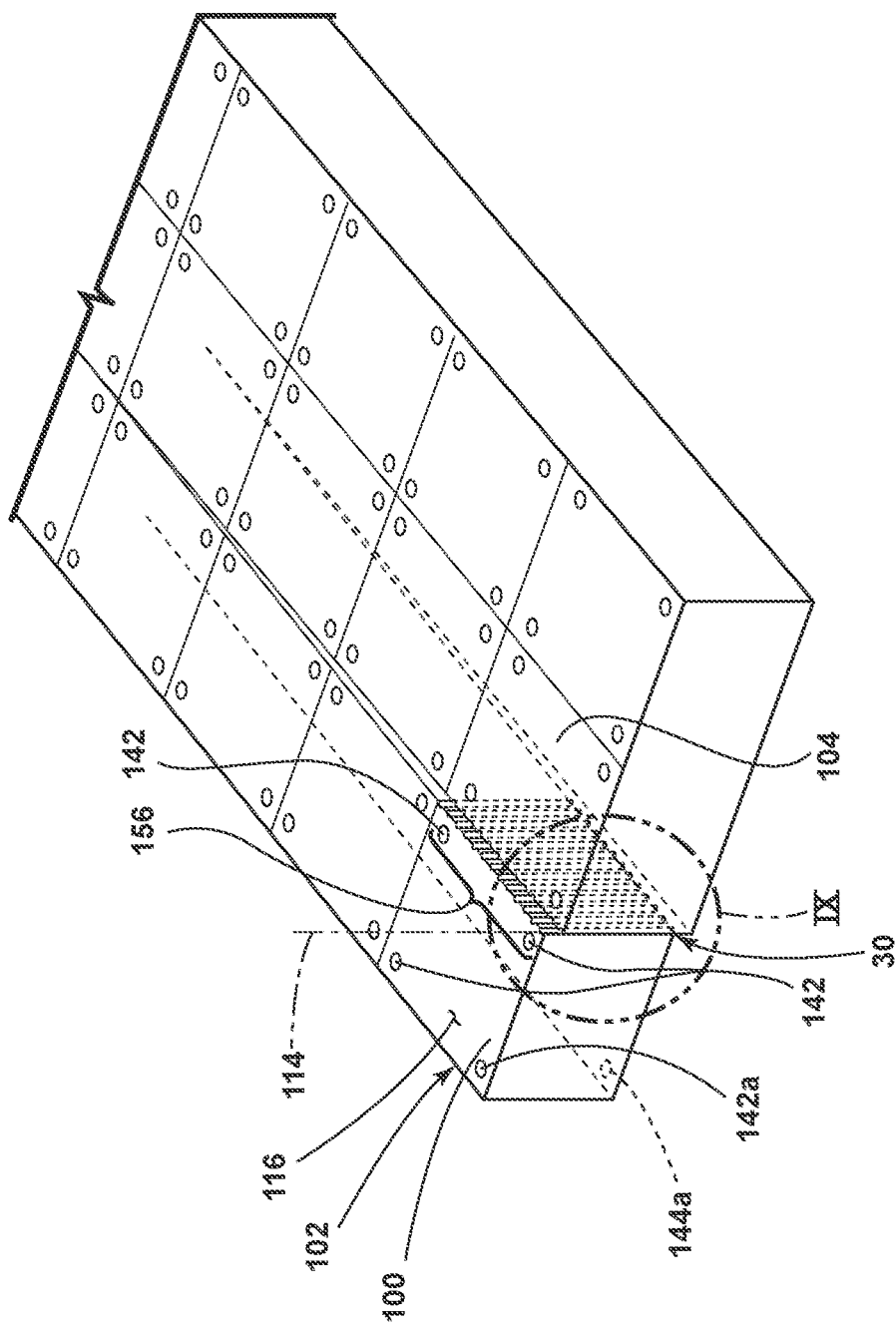
FIG. 7 is a perspective view of the array of liquid lenses of FIG. 6, illustrating a stress being applied to the array of liquid lenses at the series of perforations to separate the first liquid lens from the second liquid lens.
Figure 8:
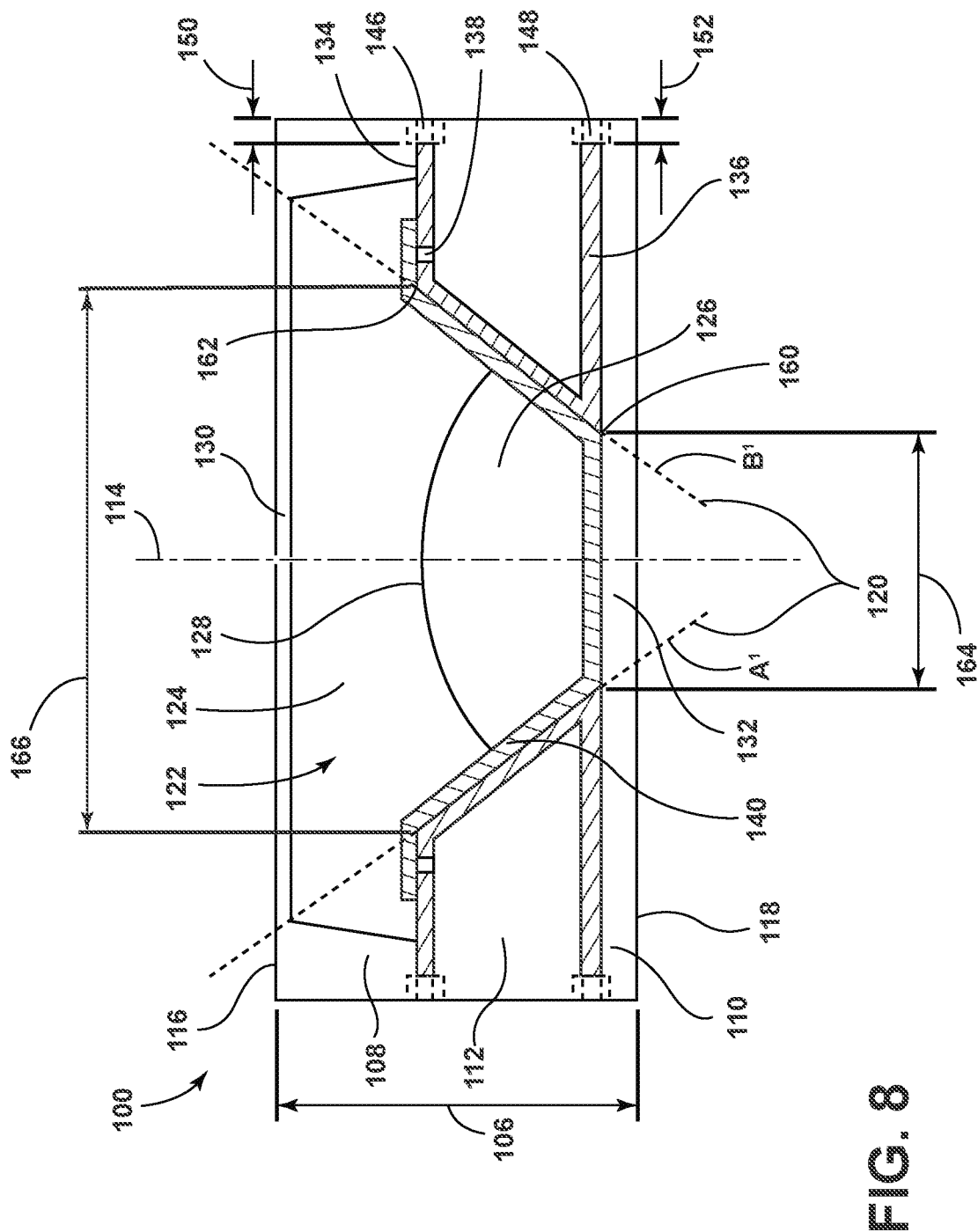
FIG. 8 is a front view of the first liquid lens of FIG. 6, taken through the cross-section VIII-VIII of FIG. 6, illustrating an intermediate layer between a first outer layer and a second outer layer, a first conductive layer between the first outer layer and the intermediate layer, and a second conductive layer between the intermediate layer and the second outer layer.
Figure 9:
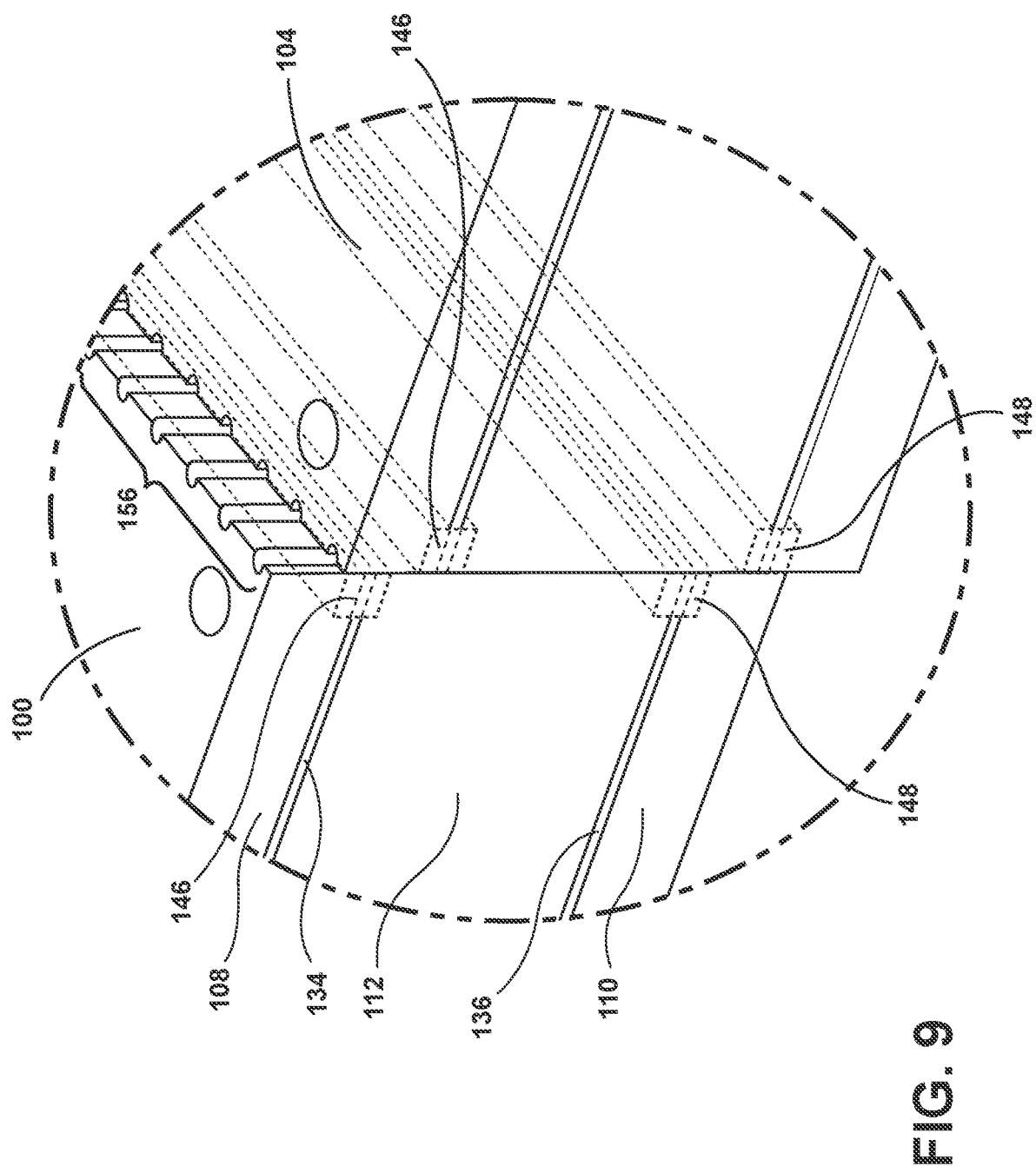
FIG. 9 is a perspective view of area IX of FIG. 7, illustrating the first liquid lens and the second liquid lens having shared a first bonded volume and a second bonded volume before the stress separated the first liquid lens from the second liquid lens at the series of perforations.
Figure 10:
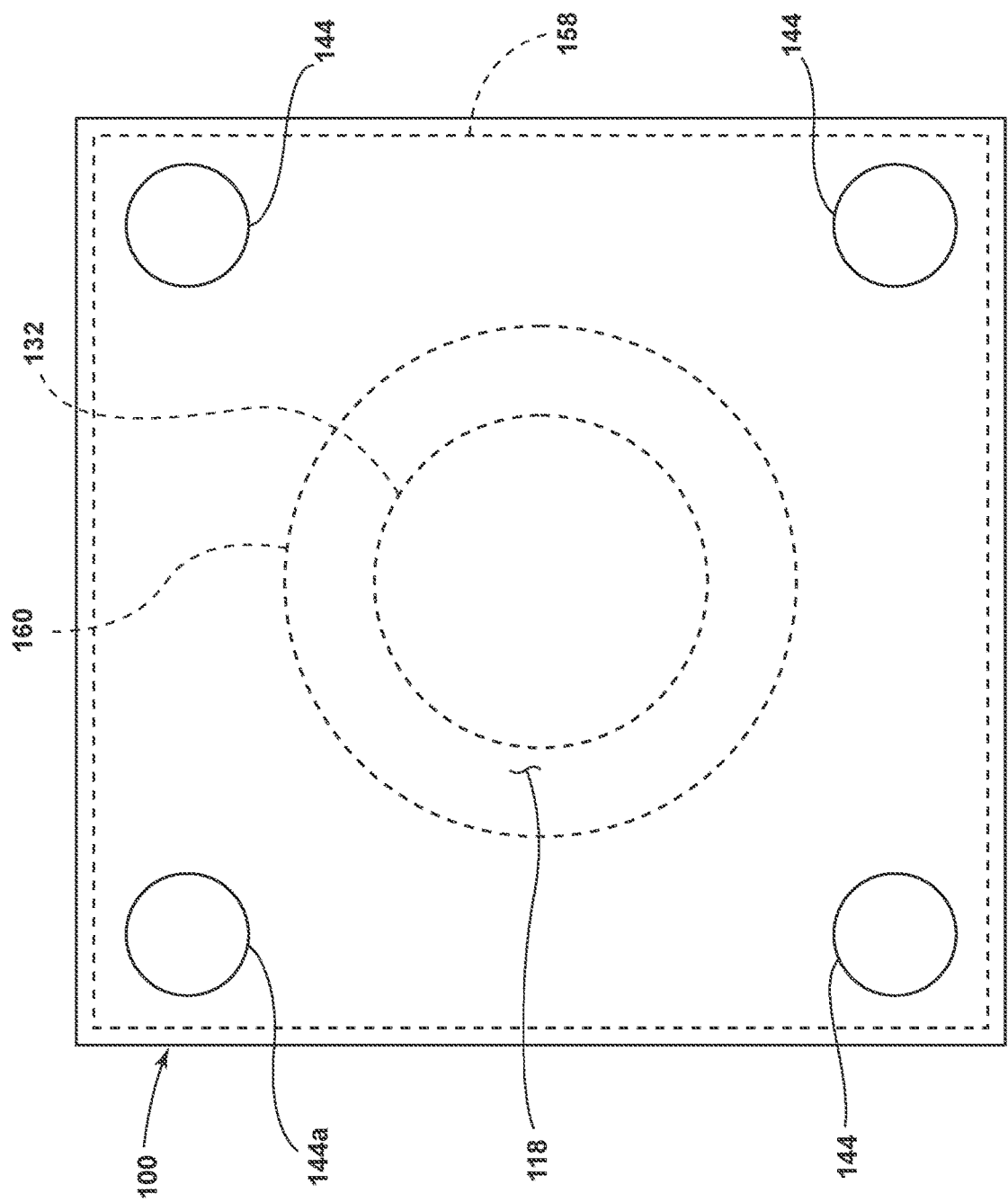
FIG. 10 is a bottom view of the first liquid lens of FIG. 6, illustrating apertures, including a second aperture, through an external surface of the second outer layer exposing the second conductive layer, as well as a contiguous outer border.
Figure 11:
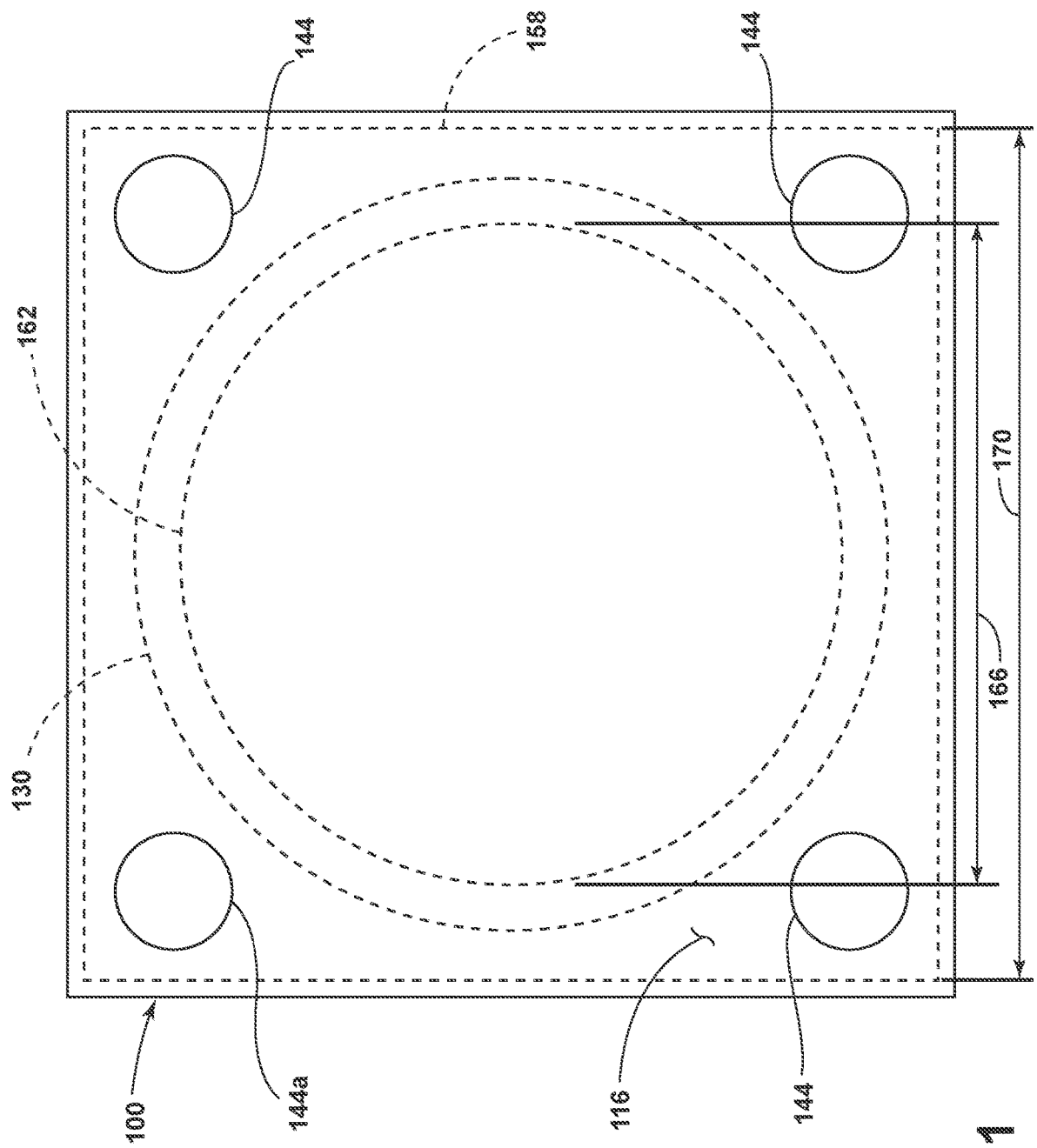
FIG. 11 is a top view of the first liquid lens of FIG. 6, illustrating apertures, including a first aperture, through an external surface of the first outer layer exposing the first conductive layer, and a diameter of a wide opening of a through hole of the first liquid lens being approximately equal to an inside width between opposite sides of a contiguous outer edge of the first liquid lens.

Referring now to FIGS. 3-5, in some embodiments, an object 12A can comprise a first layer 32, a second layer 34, and a third layer 36. The second layer 34 is disposed between the first layer 32 and the third layer 36. The first layer 32 and the third layer 36 are transparent to the wavelength of the laser 18 emission 20. The second layer 34, however, is not transparent to the wavelength of the laser 18 emission 20. As is, the laser 18 emission 20 may not be able to sufficiently perforate the thickness 16 of the object 12A through the second layer 34, because the second layer 34 would prevent further progression of the emission 20 between the first layer 32 and the third layer 36.

To overcome this problem, in some embodiments, the method includes, before using the laser 18 emission 20 to form the series of perforations 24, bonding the first layer 32 to the third layer 36 throughout a bonded volume 38 and the resulting bonded volume 38 is transparent to the wavelength of the laser 18 emission 20. In some embodiments, the bonding can be achieved via separate laser emission (not illustrated) as described in U.S. Pat. Nos. 9,492,990, 9,515,286, and/or 9,120,287, the entirety of which are incorporated herein by reference. Without being bound by any particular theory or process, it is thought that the bonding of the first layer 32 to the third layer 36 throughout the bonded volume 38 can be the result of diffusing a portion of the second layer 34 into the first layer 32 and/or into the third layer 36 throughout the bonded volume 38. The diffusion of the second layer 34 into the first layer 32 and/or the third layer 36 renders the bonded volume 38 transparent to the wavelength of the laser 18 emission 20.

Additionally, and/or alternatively, the bonding of the first layer 32 to the third layer 36 throughout the bonded volume 38 can include the melting of the first layer 32 and/or the third layer 36 and the fusing of the first layer 32 and the third layer 36 in a manner that results in the bonded volume 38 that is transparent to the wavelength of the laser 18 emission 20.

A laser 18 emission 20 can then, as described above, perforate the thickness 16 of the object 12A sequentially over the length 22 of the object 12A to form a series of perforations 24 between the first portion 10 and the second portion 14. The series of perforations 24 extend through the bonded volume 38. The first layer 32 and the third layer 36 can be any material that is transparent to the wavelength of the emission 20, such as a glass, glass-ceramic, or ceramic material. The second layer 34 can be any material that is not transparent to the wavelength of the emission 20. The second layer 34 can include any material that will diffuse into the first layer 32 and/or the third layer 36 in a manner than renders the bonded volume 38 transparent to the wavelength of the emission 20. For example, the second layer 34 can be a metal, such as gold, chromium, titanium, nickel, copper, oxides thereof, or combinations thereof. The second layer 34 can be any of, or a combination of, the metals, and oxides thereof, of Groups 4, 5, 6, 11, 13, and 14 of the Periodic Table, including mixed metal oxides. The second layer 34 can be a single layer or a plurality of layers having the same or different compositions. In some embodiments, the objects 12, 12A include an array of lens devices and the series of perforations 24 can be utilized to assist in the separation of an individual lens device from the array of lens devices. Without the series of perforations 24, the application of the stress 30 may cause fracturing of the objects 12, 12A, potentially causing the objects 12, 12A, to fail at its intended purpose (e.g., damaging the lens devices). The lens devices can be liquid lenses. Separating a liquid lens from an array of liquid lenses is discussed further below.

Referring now to FIGS. 6-10, in some embodiments, the method discussed above can be applied to separate a first liquid lens 100 of an array of liquid lenses 102 from a second liquid lens 104 of the array of liquid lenses 102. The method can include forming the array of liquid lenses 102, including the first liquid lens 100 adjacent the second liquid lens 104. The array of liquid lenses 102 has a thickness 106. More specifically, each of the liquid lenses of the array of liquid lenses 102, such as the first liquid lens 100 and the second liquid lens 104, includes a first outer layer 108, a second outer layer 110, and an intermediate layer 112 between the first outer layer 108 and the second outer layer 110. As the second liquid lens 104 has, and each of the liquid lenses of the array of liquid lenses 102 have, the same structure as the first liquid lens 100, only the first liquid lens 100 will be particularly described herein, unless otherwise noted.

In some embodiments, the first liquid lens 100 has an optical axis 114. The first outer layer 108 has an external surface 116. The second outer layer 110 likewise has an external surface 118. The thickness 106 of the array of liquid lenses 102 is defined by the distance between the external surface 116 of the first outer layer 108 and the external surface 118 of the second outer layer 110. The intermediate layer 112 has a through hole 120 (also referred to as a bore) denoted by dotted lines A' and B'. The optical axis 114 extends through the through hole 120. The through hole 120 is rotationally symmetric about the optical axis 114, and can take a variety of shapes, for example, as set forth in U.S. Pat. No. 8,922,901, which is hereby incorporated by reference in its entirety. The first outer layer 108, the second outer layer 110, and the through hole 120 of the intermediate layer 112 define a cavity 122. In other words, the cavity 122 is disposed between the first outer layer 108 and the second outer layer 110, and within the through hole 120 of the intermediate layer 112. The first outer layer 108, the second outer layer 110, and the intermediate layer 112 are all transparent to the wavelength of the laser 18 emission 20. A small gap (not illustrated) may separate each of the first outer layer 108, the second outer layer 110, and the intermediate layer 112 from their adjacent layer. The through hole 120 has a narrow opening 160 and a wide opening 162. The narrow opening 160 has a diameter 164. The wide opening 162 has a diameter 166. In some embodiments, the diameter 166 of the wide opening 162 is greater than the diameter 164 of the narrow opening 160.

The first liquid lens 100 further includes a first liquid 124 and a second liquid 126 disposed within the cavity 122. Because of the properties of the first liquid 124 and the second liquid 126, the first liquid 124 and the second liquid 126 separate and are separated at an interface 128, which can be substantially non-miscible or non-miscible. The first liquid 124 can be a polar liquid or a conducting liquid. Additionally, or alternatively, the second liquid 126 can be a non-polar liquid or an insulating liquid. The first liquid 124 can be substantially immiscible with, and has a different refractive index than, the second liquid 126, such that the interface 128 between the first liquid 124 and the second liquid 126 forms, thus making a lens. The first liquid 124 and the second liquid 126 can have substantially the same density, which can help to avoid changes in the shape of the interface 128 as a result of changing the physical orientation of the first liquid lens 100 (e.g., as a result of gravitational forces).

The first liquid lens 100 further includes a first window 130 and a second window 132. The first window 130 can be part of the first outer layer 108. The second window 132 can be part of the second outer layer 110. For example, a portion of the first outer layer 108 covering the cavity 122 serves as the first window 130, and a portion of the second outer layer 110 covering the cavity 122 serves as the second window 132. In some embodiments, image light enters the first liquid lens 100 through the first window 130, is refracted at the interface 128 between the first liquid 124 and the second liquid 126, and exits the first liquid lens 100 through the second window 132.

The first outer layer 108 and/or the second outer layer 110 can comprise a sufficient transparency to enable passage of the image light. For example, the first outer layer 108 and/or the second outer layer 110 can comprise a polymeric, a glass, ceramic, or glass-ceramic material. Because image light can pass through the through hole 120 in the intermediate layer 112, the intermediate layer 112 need not be transparent to the image light. However, the intermediate layer 112 can be transparent to the image light. The first outer layer 108, the second outer layer 110, and the intermediate layer 112 are all transparent to the wavelength of the laser 18 emission 20. The intermediate layer 112 can comprise a metallic, polymeric, a glass, ceramic, or glass-ceramic material. In the illustrated embodiment, each of the first outer layer 108, the second outer layer 110, and the intermediate layer 112 comprise a glass material. The external surfaces 116, 118 of the first outer layer 108 and/or the second outer layer 110, respectively, can be, and in the illustrated embodiment, are substantially planar. Thus, although the first liquid lens 100 can function as a lens (e.g., by refracting image light passing through the interface 128), the external surfaces 116, 118 of the first liquid lens 100 can be flat as opposed to being curved like outer surfaces of a fixed lens. In other embodiments, the external surfaces 116, 118 of the first outer layer 108 and/or the second outer layer 110, respectively, can be curved (e.g., concave or convex). Thus, the first liquid lens 100 comprises an integrated fixed lens.

The first liquid lens 100 further includes a first conductive layer 134 and a second conductive layer 136. The first conductive layer 134 is disposed between the first outer layer 108 and the intermediate layer 112. The second conductive layer 136 is disposed between the intermediate layer 112 and the second outer layer 110 and extends through the through hole 120 in the intermediate layer 112. The first conductive layer 134 and the second conductive layer 136 can be applied (such as by coating) to the intermediate layer 112 as one contiguous conductive layer before the first outer layer 108 and the second outer layer 110 are attached to the intermediate layer 112. In other words, substantially all of the intermediate layer 112 can be coated with a conductive layer. The conductive layer can then be segmented into the first conductive layer 134 and the second conductive layer 136. For example, the first liquid lens 100 can include a scribe 138 in the conductive layer to form the first conductive layer 134 and the second conductive layer 136 and isolate (e.g., electrically isolate) the first conductive layer 134 and the second conductive layer 136 from each other.

In some embodiments, the first conductive layer 134 and the second conductive layer 136 are not transparent to the wavelength of the laser 18 emission 20. Each of the first conductive layer 134 and the second conductive layer 136 can be metal or comprise metal. In the illustrated embodiment, the first conductive layer 134 and the second conductive layer 136 each comprise metal. The first conductive layer 134 and the second conductive layer 136 can include one or more of the metals, and/or oxides thereof, of Groups 4, 5, 6, 11, 13, and 14 of the Periodic Table, including mixed metal oxides. Example metals include gold, chromium, titanium, nickel, and/or copper including oxides thereof. Other materials for the first conductive layer 134 and the second conductive layer 136 can include a conductive polymer material, another suitable conductive material, or a combination thereof. Either of or both of the first conductive layer 134 and the second conductive layer 136 can comprise a single layer or a plurality of layers, some or all of which can be conductive. The first conductive layer 134 functions as a common electrode in electrical communication with the first liquid 124. The second conductive layer 136 functions as a driving electrode. The second conductive layer 136 is disposed on the through hole 120 as well as between the intermediate layer 112 and the second outer layer 110.

The second conductive layer 136 is insulated from the first liquid 124 and the second liquid 126, via an insulating layer 140. The insulating layer 140 can comprise an insulating coating applied to the intermediate layer 112 before attaching the first outer layer 108 and/or the second outer layer 110 to the intermediate layer 112. The insulating layer 140 can comprise an insulating coating applied to the second conductive layer 136 and the second window 132 after attaching the second outer layer 110 to the intermediate layer 112 and before attaching the first outer layer 108 to the intermediate layer 112. Thus, the insulating layer 140 covers at least a portion of the second conductive layer 136 within the cavity 122 and the second window 132. The insulating layer 140 can be sufficiently transparent to enable passage of image light through the second window 132 as described herein. The insulating layer 140 can cover at least a portion of the second conductive layer 136 (acting as the driving electrode) (e.g., the portion of the second conductive layer 136 disposed within the cavity 122) to insulate the first liquid 124 and the second liquid 126 from the second conductive layer 136. Additionally, or alternatively, at least a portion of the first conductive layer 134 (acting as the common electrode) disposed within the cavity 122 is uncovered by the insulating layer 140. Thus, the first conductive layer 134 can be in electrical communication with the first liquid 124 as described herein.

The first liquid lens 100 further includes one or more apertures 142, including a first aperture 142a (see FIG. 6), through the first outer layer 108. The apertures 142 comprise portions of the first liquid lens 100 at which the first conductive layer 134 is exposed through the first outer layer 108, such as via removal of a portion of the first outer layer 108 or otherwise. Thus, the apertures 142 are configured to enable electrical connection to the first conductive layer 134, and the regions of the first conductive layer 134 exposed at the apertures 142 can serve as contacts to enable electrical connection of the first liquid lens 100 to a controller, a driver, or another component of a lens or camera system. In other words, the apertures 142 provide an electrical contact point between the first liquid lens 100 and another electrical device.

Likewise, the first liquid lens 100 can comprise one or more apertures 144, including a second aperture 144a (see FIG. 10), through the second outer layer 110. The apertures 144 comprise portions of the first liquid lens 100 at which the second conductive layer 136 is exposed through the second outer layer 110, such as via removal of a portion of the second outer layer 110 or otherwise. Thus, the apertures 144 are configured to enable electrical connection to the second conductive layer 136, and the regions of the second conductive layer 136 exposed at the apertures 144 can serve as contacts to enable electrical connection of the first liquid lens 100 to a controller, a driver, or another component of a lens or camera system.

In other words, the apertures 142, 144 provide an electrical contact point between the first liquid lens 100 and another electrical device. Different voltages can be supplied to the first conductive layer 134 and the second conducive layer 136 via the apertures 142, 144 to change the shape of the interface 128, a process referred to as electrowetting. For example, applying a voltage to increase or decrease the wettability of the surface of the cavity 122 with respect to the first liquid 124 can change the shape of the interface 128. Changing the shape of the interface 128 can change the focal length or focus of the first liquid lens 100. For example, such a change of focal length can enable the first liquid lens 100 to perform an autofocus function. Additionally, or alternatively, adjusting the interface 128 can tilt the interface 128 relative to the optical axis 114 of the first liquid lens 100. For example, such tilting can enable the first liquid lens 100 to perform an optical image stabilization (OIS) function. Adjusting the interface 128 can be achieved without physical movement of the first liquid lens 100 relative to an image sensor, a fixed lens or lens stack, a housing, or other components of a camera module in which the first liquid lens 100 can be incorporated.

The method of separating the first liquid lens 100 of the array of liquid lenses 102 from the second liquid lens 104 of the array of liquid lenses 102 can further include bonding the first outer layer 108 to the intermediate layer 112 throughout a first bonded volume 146 in a manner than the first bonded volume 146 is transparent to the wavelength of the laser 18 emission 20, and bonding the intermediate layer 112 to the second outer layer 110 throughout a second bonded volume 148 in a manner that the second bonded volume 148 is transparent to the wavelength of the laser 18 emission 20. In some embodiments, bonding the first outer layer 108 to the intermediate layer 112 throughout a first bonded volume 146 in a manner that the first bonded volume 146 is transparent to the wavelength of the laser 18 emission 20 includes diffusing the first conductive layer 134 into the first outer layer 108 and the intermediate layer 112 forming the first bonded volume 146 that is transparent to the wavelength of the laser 18 emission 20. Likewise, bonding the intermediate layer 112 to the second outer layer 110 throughout the second bonded volume 148 in a manner that the second bonded volume 148 is transparent to the wavelength of the laser 18 emission 20, includes diffusing the second conductive layer 136 into the intermediate layer 112 forming the second bonded volume 148 that is transparent to the wavelength of the laser 18 emission 20. In other embodiments, bonding the first outer layer 108 to the intermediate layer 112 throughout a first bonded volume 146 in a manner that the first bonded volume 146 is transparent to the wavelength of the laser 18 emission 20 includes melting the first outer layer 108 and the intermediate layer 112, and fusing the first outer layer 108 and the intermediate layer together 112. Likewise, bonding the intermediate layer 112 to the second outer layer 110 throughout a second bonded volume 148 in a manner that the second bonded volume 148 is transparent to the wavelength of the laser 18 emission 20, includes melting the intermediate layer 112 and the second outer layer, 110 and fusing the intermediate layer 112 and the second outer layer 110 together. As mentioned above, although the first outer layer 108, the intermediate layer 112, and the second outer layer 110 are transparent to the wavelength of the laser 18 emission 20, the first conductive layer 134 and the second conductive layer 136 may not be. Whether via diffusion of first conductive layer 134 into the first outer layer 108 and/or the intermediate layer 112, or via melting and fusing the first outer layer 108 and intermediate layer 112, or otherwise, the bonding of the first outer layer 108 to the intermediate layer 112 results in the first bonded volume 146 that is transparent to the wavelength of the laser 18 emission 20. Similarly, whether via diffusion of second conductive layer 136 into the second outer layer 110 and/or the intermediate layer 112, or via melting and fusing the second outer layer 110 and intermediate layer 112, or otherwise, the bonding of the second outer layer 110 to the intermediate layer 112 results in the second bonded volume 148 that is transparent to the wavelength of the laser 18 emission 20.

In other words, the first outer layer 108 is bonded with the intermediate layer 112 at the first bonded volume 146, and the second outer layer 110 is bonded with the intermediate layer 112 at the second bonded volume 148. In some embodiments, the first bonded volume 146 includes a portion of the first conductive layer 134 diffused into both the first outer layer 108 and the intermediate layer 112, and the second bonded volume 148 includes a portion of the second conductive layer 136 diffused into both the intermediate layer 112 and the second outer layer 110.

The array of liquid lenses 102 is rendered transparent to the laser 18 emission 20 through the first bonded volume 146 and the second bonded volume 148. The first bonded volume 146 is disposed spatially above the second bonded volume 148. The first bonded volume 146 has a first width 150 and the second bonded volume 148 has a second width 152, which are generally parallel to the external surface 116 of the first outer layer 108. Bonding of the first outer layer 108 to the intermediate layer 112 via the first bonded volume 146 and bonding of the intermediate layer 112 to the second outer layer 110 via the second bonded volume 148 encloses the first liquid lens 100. As mentioned above, the first outer layer 108 may be separated from the intermediate layer 112 by a gap (not illustrated), which is minimal immediately adjacent to the first bonded volume 146. Likewise, the second outer layer 110 may be separated from the intermediate layer 112 by a gap (not illustrated), which is minimal adjacent to the second bonded volume 148.

The method of separating the first liquid lens 100 of the array of liquid lenses 102 from the second liquid lens 104 of the array of liquid lenses 102 can further include using the laser 18 emission 20, which is at a wavelength, to perforate at least a portion of the thickness 106 of the array of liquid lenses 102 sequentially over a length 154 of the array of liquid lenses 102 to form a series of perforations 156 between the first liquid lens 100 on one side of the series of perforations 156 and the second liquid lens 104 on the other side of the series of perforations 156. The thickness 106 of the array of liquid lenses 102 is transparent to the wavelength of the laser 18 emission 20 at the series of perforations 156. Perforating of at least a portion of the thickness 106 of the array of liquid lenses 102 can include perforating through the first outer layer 108, the second outer layer 110, and the intermediate layer 112 of the first liquid lens 100. Further, perforating of at least a portion of the thickness 106 of the array of liquid lenses 102 can include perforating through the first bonded volume 146 and the second bonded volume 148 of the first liquid lens 100. Note that, before the first bonded volume 146 and the second bonded volume 148 are perforated, the portion of the first bonded volume 146 and the second bonded volume 148 of the first liquid lens 100 adjacent to the second liquid lens 104 is shared in common as the first bonded volume 146 and the second bonded volume 148 of the second liquid lens 104 (see FIG. 9). The series of perforations 156 through the portion of the first bonded volume 146 and the second bonded volume 148 that the first liquid lens 100 and the second liquid lens 104 share in common are configured to assist in the separation of the first liquid lens 100 from the second liquid lens 104, as discussed further below.

In some embodiments the first width 150 and the second width 152 are different. For example, the first width 150 can be wider than the second width 152. As another example, the second width 152 can be wider than the first width 150. The width (first width 150 or second width 152) of whichever of the first bonded volume 146 or the second bonded volume 148 is closest to the laser 18 emission 20 forming the series of perforations 156 (i.e., that is used to perforate) can be the wider width and the other width is the narrower width. In the illustrated example of FIG. 6, because the first bonded volume 146 is closer to the emission 20 than the second bonded volume 148, the first width 150 of the first bonded volume 146 is wider than the second width 152 of the second bonded volume 148, which is narrower. The minimum first width 150 and minimum second width 152 of the first bonded volume 146 and the second bonded volume 148, respectively, can be a function of the numerical aperture of the laser 18 optics, the refractive index of the layers of the first liquid lens 100 between the first bonded volume 146 and the laser 18 emission 20 (e.g., the first outer layer 108) or between the second bonded volume 148 and the laser 18 emission 20 (i.e., the first outer layer 108, the first bonded volume 146, and the intermediate layer 112) as the case may be, and thickness of the layers of the first liquid lens 100 between the first bonded volume 146 and the laser 18 emission 20 (e.g., the first outer layer 108) or between the second bonded volume 148 and the laser 18 emission 20 (i.e., the first outer layer 108, the first bonded volume 146, and the intermediate layer 112) as the case may be. More specifically, the minimum first width 150 and minimum second width 152 of the first bonded volume 146 and the second bonded volume 148, respectively, can be a function of the equation $W=(NA/n)*T*2$, where NA is the numerical aperture of the laser 18 optics, n is the refractive index of the layer(s) of the first liquid lens 100 between the bonded volume at issue (first bonded volume 146 or second bonded volume 148) and the emission 20, and T is the thickness of the layer(s) of the first liquid lens 100 between the bonded volume at issue (first bonded volume 146 or second bonded volume 148) and the emission 20. Small angle approximation is used here assuming that $NA=n*\sin \Theta =\tilde{}n*\tan \Theta$. Assuming, for example, that the first width 150 is closer to the emission 20 forming the series of perforations 156, the first width 150 divided by the distance between the first bonded volume 146 and the external surface 118 of the second outer layer 110, should be greater than about 0.15, including greater than about 0.2, and greater than about 0.25. For example, if the distance between the first bonded volume 146 and the external surface 118 of the second outer layer 110 is 700 μm, then to provide the ratio of 0.15, the first width 150 should be about 105 microns. As another example, if the distance between the first bonded volume 146 and the external surface 118 of the second outer layer 110 is 700 μm, then to provide the ratio of 0.25, the first width should be about 175 microns. Assuming still that the first width 150 is closer to the emission 20 forming the series of perforations 156, the second width 152 divided by the distance between the second bonded volume 148 and the external surface 118 of the second outer layer 110 should be greater than about 0.15, including greater than about 0.2, and greater than about 0.25. In some embodiments, the first width 150 and the second width 152 are at least about 10 percent different. In some embodiments, the first width 150 and the second width 152 are at least about 50 percent different. In some embodiments, whichever of the first width 150 and the second width 152 is closer to the emission 20 forming the series of perforations 156 (e.g., closer to the laser 18 during the forming the series of perforations) is more than twice the width of the other of the first width 150 and the second width 152.

In some embodiments, the laser 18 emission 20 is a quasi non-defracting beam (e.g., focal line, Gauss-Bessel beam, among others). Using a non-defracting beam, the perforations of the series of perforations 156 can extend through the entire thickness 106 of the array of liquid lenses 102 (or, more generally, the thickness 16 of the object 12/12A), with a high degree of accuracy (e.g., perforation diameter and spacing, as discussed elsewhere), despite the existence of disparate layers (e.g., first outer layer 108, second outer layer, 110, first bonded volume 146, etc.). Other types of laser emissions may not be able to perforate the thickness 106/16, and/or damage various of the disparate layers (e.g., first outer layer 108 etc.). The numerical aperture (NA) discussion above applies particularly to the emission 20 of the non-defracting beam variety. In some embodiments, the numerical aperture (NA) is 0.275 but could be as low as 0.14. In other embodiments, the numerical aperture (NA) is between 0.14 and 0.30, including between 0.14 and 0.275.

The resulting perforations of the series of perforations 156, as discussed above, include perforations that have a diameter of between 3 µm and 7 µm. Both the first aperture 142a and the second aperture 144a, as well as all of the other apertures 142, 144, of the first liquid lens 100 are disposed between the optical axis 114 of the first liquid lens 100 and the series of perforations 156. Further, in some embodiments, the first aperture 142a (as well as the other first apertures 142) are disposed between the first window 130 and the series of perforations 156, and the second aperture 144a (as well as the other second apertures 144) are disposed between the second window and the series of perforations 146.

In an alternative embodiment of the method, the series of perforations 156 are made through the array of liquid lenses 102, not through the first bonded volume 146 and the second bonded volume 148, but adjacent the first bonded volume 146 and the second bonded volume 148 where the above-described gaps between the first outer layer 108 and the intermediate layer 112, and the second outer layer 110 and the intermediate layer 112, respectively, are minimal immediately adjacent to the first bonded volume 146 and second bonded volume 148. Without being bound by any particular theory, the regions immediately adjacent to the first bonded volume 146 and the second bonded volume 148 may also be rendered transparent to the wavelength of the laser 18 emission 20. Alternatively and/or additionally, the first conductive layer 134 and the second conductive layer 136 immediately adjacent to the first bonded volume 146 and the second bonded volume 148 can be further ablated to render the first liquid lens 100 transparent to the wavelength of the laser 18 emission 20 at that area.

The method further includes applying the stress 30 to the array of liquid lenses 102 at the series of perforations 156 to separate the first liquid lens 100 from the second liquid lens 104. As discussed above, the stress 30 can be provided by anything that stresses the array of liquid lenses 102 at the series of perforations 156 between the first liquid lens 100 and the second liquid lens 104, such as, for example, any tensile stress, by in-plane pulling, application of heat from a thermal or infrared laser (e.g., $CO_2$ or CO laser), thermal shock, heating, cooling, among other things. For example, a thermal shock or thermal crack propagation (via laser emission or otherwise) can be applied to the array of liquid lenses 102 at the series of perforations 156 until the first liquid lens 100 separates from the second liquid lens 104. All the remaining liquid lenses of the array of liquid lenses 102 can be separated from each other and the array of liquid lenses 102 in the same manner. As mentioned above in relation to object 12/12A, the stress 30 can be provided by bending the array of liquid lenses 102 at the series of perforations 156. In some embodiments, stress 30 is provided by a tape base die expander. In some embodiments, the stress 30 is imparted while the array of liquid lenses 102 is mounted on a tape (such as a polymer tape), including while the emission 20 is imparting the series of perforations 156.

After the first liquid lens 100 is separated from the second liquid lens 104 and the remainder of the array of liquid lenses 102, the combination of the first bonded volume 146 and the second bonded volume 148 are part of a contiguous outer edge 158 of the first liquid lens 100, along with the separated first outer layer 108, the intermediate layer 112, and the second outer layer 110. The first aperture 142a and the second aperture 144a, as well as all other apertures 142, 144, are between the optical axis 114 of the first liquid lens 100 and the contiguous outer edge 158. The apertures 142 (including the first aperture 142) can be disposed between the first window 130 and the contiguous outer edge 158. The apertures 144 including the second aperture 144a) can be disposed between the second window 132 and the contiguous outer edge 158. In some embodiments, the wide opening 162 is approximately adjacent to the first bonded volume 146 at some places, and the diameter 166 of the wide opening 162 is approximately equal to (just less than) an inside width 170 between opposite sides of the contiguous outer edge 158 of the first liquid lens 100. The first liquid lens 100 can be transparent to visible light through the first bonded volume 146 and the second bonded volume 148.

It will be apparent to those skilled in the art that various modifications and variations can be made without departing from the spirit or scope of the claims.

What is claimed is:

1. A method of separating a portion of an object comprising a first layer that is transparent to a wavelength of a laser emission, a second layer that is not transparent to the wavelength of the laser emission, and a third layer that is transparent to the wavelength of the laser emission, the method comprising:

bonding the first layer to the third layer throughout a bonded volume, whereby the bonded volume is transparent to the wavelength of the laser emission;

perforating at least a portion of a thickness of the object sequentially over a length using the laser emission at the wavelength to form a series of perforations between a first portion of the object on one side of the series of perforations and a second portion of the object on the other side of the series of perforations, the series of perforations extending through the bonded volume; and applying a stress to the object at the series of perforations to separate the first portion of the object from the second portion of the object;

wherein the thickness of the object, at the series of perforations, is transparent to the wavelength of the laser emission; and wherein the bonding the first layer to the third layer throughout the bonded volume comprises diffusing at least a portion of the second layer into the first layer and into the third layer to form the bonded volume, wherein diffusing the second layer into the first layer and into the third layer renders the bonded volume transparent to the wavelength of the laser emission.

2. The method of claim 1, wherein the laser emission perforates the entire thickness of the object.

3. The method of claim 1, wherein the series of perforations comprises perforations that have a diameter of between 3 µm and 7 µm.

4. The method of claim 1, wherein the series of perforations comprises a first perforation and a second perforation separated by a distance of between 7 µm and 10 µm.

5. The method of claim 1,
wherein the bonding the first layer to the third layer throughout the bonded volume comprises melting the first layer and the third layer to fuse the first layer and the third layer together.

6. The method of claim 1, wherein the second layer comprises a metal.

7. The method of claim 1, wherein the first layer comprises a glass material.

8. The method of claim 1, wherein:
the object is an array of lens devices; and
the stress comprises bending the object at the series of perforations.

9. The method of claim 8, wherein the lens devices are liquid lenses.

10. A method of separating liquid lenses, the method comprising:
bonding a first outer layer of a first liquid lens to an intermediate layer of the first liquid lens throughout a first bonded volume, whereby the first bonded volume is transparent to the wavelength of the laser emission;
bonding the intermediate layer to a second outer layer of the first liquid lens throughout a second bonded volume, whereby the second bonded volume is transparent to the wavelength of the laser emission, wherein the first bonded volume is disposed spatially above the second bonded volume;
perforating at least a portion of a thickness of an array of liquid lenses sequentially over a length of the array of liquid lenses using a laser emission at a wavelength to form a series of perforations between the first liquid lens on one side of the series of perforations and a second liquid lens on the other side of the series of perforations; and
applying a stress to the array of liquid lenses at the series of perforations to separate the first liquid lens from the second liquid lens.

11. The method of claim 10, wherein:
the intermediate layer is between the first outer layer and the second outer layer, the intermediate layer having a through hole, the first outer layer having an external surface and the second outer layer having an external surface;
a cavity disposed between the first outer layer and the second outer layer, and within the through hole; and
a first liquid and a second liquid disposed within the cavity, the first liquid and the second liquid separated at an interface;
the first outer layer, the second outer layer, and the intermediate layer are transparent to the wavelength of the laser emission;
the thickness of the array of liquid lenses is between the external surface of the first outer layer and the external surface of the second outer layer of the first liquid lens; and
the perforating at least a portion of the thickness of the array of liquid lenses comprises perforating through the first outer layer, the second outer layer, and the intermediate layer of the first liquid lens.

12. The method of claim 10, wherein:
the first liquid lens comprises:
a first conductive layer that is not transparent to the wavelength of the laser emission between the first outer layer and the intermediate layer; and
a second conductive layer that is not transparent to the wavelength of the laser emission between the intermediate layer and the second outer layer.

13. The method of claim 10, wherein the perforating at least a portion of the thickness of the array of liquid lenses comprises perforating through the first bonded volume and the second bonded volume of the first liquid lens.

14. The method of claim 10, wherein:
the first bonded volume has a width;
the second bonded volume has a width;
the width of the first bonded volume and the second bonded volume are different; and
the width of whichever of the first bonded volume or the second bonded volume is closer to the laser emission used to perforate is at least ten percent wider than the other width.

15. The method of claim 1, wherein the second layer comprise a metal, a metal oxide, or a combination of a metal and a metal oxide.

* * * * *